(12) United States Patent
Tchagaspanian

(10) Patent No.: US 6,646,489 B1
(45) Date of Patent: Nov. 11, 2003

(54) DEVICE FOR SWITCHING RADIO FREQUENCY SIGNALS

(75) Inventor: Michaël Tchagaspanian, Echirolles (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/365,422

(22) Filed: Aug. 2, 1999

(30) Foreign Application Priority Data

Aug. 3, 1998 (FR) .............................................. 98 09930

(51) Int. Cl.$^7$ ................................................ H01P 1/22
(52) U.S. Cl. ....................... 327/427; 327/308; 333/103; 333/81 R
(58) Field of Search ................................. 327/427, 308, 327/365, 374, 376, 377; 333/101, 103, 81 R, 104

(56) References Cited

U.S. PATENT DOCUMENTS

| | | | |
|---|---|---|---|
| 4,921,465 A | * 5/1990 | Hietala et al. | 455/193 |
| 5,499,392 A | 3/1996 | Grunwell | 455/260 |
| 5,689,818 A | 11/1997 | Caglio et al. | 455/83 |
| 5,818,099 A | * 10/1998 | Burghartz | 327/427 |
| 5,969,560 A | * 10/1999 | Kohama et al. | 327/308 |
| 6,064,264 A | * 5/2000 | Tarsia et al. | 330/277 |
| 6,385,438 B1 | * 5/2002 | Zellweger et al. | 455/78 |

OTHER PUBLICATIONS

French Search Report dated Apr. 22, 1999, with annex on French Application No. 98 09930.

* cited by examiner

*Primary Examiner*—Dinh Le
(74) *Attorney, Agent, or Firm*—Lisa K. Jorgenson; Stephen Bongini; Fleit, Kain, Gibbons, Gutman & Bongini P.L.

(57) ABSTRACT

A device for switching radio frequency signals that includes at least a first MOS transistor for selectively interrupting or transmitting the signals between at least first and second terminals as a function of a control signal. The gate of the first MOS transistor is connected to the first terminal, and both the drain and source of the first MOS transistor are connected to the second terminal. In a preferred embodiment, the first MOS transistor selectively interrupts or transmits the signals between the first terminal and the second terminal, and the device also includes a second MOS transistor for selectively interrupting or transmitting the signals between the first terminal and a third terminal. A system for processing radio frequency signals is also provided. The system includes at least one device for switching radio frequency signals, and the device includes at least a first MOS transistor for selectively interrupting or transmitting the signals between at least first and second terminals of the system as a function of a control signal. The gate of the first MOS transistor is connected to the first terminal, and both the drain and source of the first MOS transistor are connected to the second terminal.

23 Claims, 4 Drawing Sheets

DEVICE FOR SWITCHING RADIO FREQUENCY SIGNALS

CROSS-REFERENCE TO RELATED APPLICATIONS

This application is based upon and claims priority from prior French Patent Application No. 98-09930, filed Aug. 3, 1998, the entire disclosure of which is herein incorporated by reference.

BACKGROUND OF THE INVENTION

1. Field of the Invention

The present invention relates to electronic devices, and more specifically to devices for switching radio frequency signals.

2. Description of Related Art

Devices for switching radio frequency signals are very important components in radio frequency systems that have multiple operating modes. Exemplary systems include reception and transmission systems, such as GSM telephones and radio frequency head remote controls. Such switching devices can be used to specify which path a radio frequency signal should follow according to the selected mode of operation. They can also be used to connect or disconnect system components to and from one another (e.g., switching an antenna between the receiver and the transmitter of a radio frequency device). They can also be used to enable or disable certain components as a function of the selected mode (e.g., an attenuator or an amplifier).

Conventional mechanical switching devices have satisfactory isolation performance but suffer from extremely slow switching speeds and very high costs. Conventional switching devices using gallium arsenide components perform satisfactorily but also suffer from very high costs. On the other hand, conventional switching devices based on MOS transistors integrated on an electronic chip occupy a considerable amount of space on the chip and also suffer from high costs while providing relatively poor performance.

A MOS transistor acting as a switch is normally connected so as to transmit signals between its drain and source, while being controlled by a voltage applied to its gate. If the voltage $V_{gs}$ between the gate and the source is below a threshold voltage $V_t$, the transistor is referred to as "off" and there is no conduction between the drain and source. If the voltage $V_{gs}$ is above the threshold voltage $V_t$, a conducting channel forms between the drain and the source to allow a signal to pass. However, the resistance between the drain and source of such a MOS transistor is proportional to the distance between the drain and source, and inversely proportional to the product of the width times the thickness between the drain and source. In order to obtain a drain-source resistance of low value, in particular the reference value of 50 ohms that constitutes the typical input resistance of the downstream circuits, it is necessary to provide a very wide channel zone.

SUMMARY OF THE INVENTION

In view of these drawbacks, it is an object of the present invention to overcome the above-mentioned drawbacks and to provide a switching device that has a more efficient and improved performance.

It is another object of the present invention to provide a switching device that is inexpensive.

Still another object of the present invention is to provide a switching device that takes up little space on an electronic chip.

One embodiment of the present invention provides a device for switching radio frequency signals. The device includes at least a first MOS transistor for selectively interrupting or transmitting the signals between at least first and second terminals as a function of a control signal. The gate of the first MOS transistor is connected to the first terminal, and both the drain and source of the first MOS transistor are connected to the second terminal. In a preferred embodiment, the first MOS transistor selectively interrupts or transmits the signals between the first terminal and the second terminal, and the device also includes a second MOS transistor for selectively interrupting or transmitting the signals between the first terminal and a third terminal.

Another embodiment of the present invention provides a system for processing radio frequency signals. The system includes at least one device for switching radio frequency signals, and the device includes at least a first MOS transistor for selectively interrupting or transmitting the signals between at least first and second terminals of the system as a function of a control signal. The gate of the first MOS transistor is connected to the first terminal, and both the drain and source of the first MOS transistor are connected to the second terminal.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
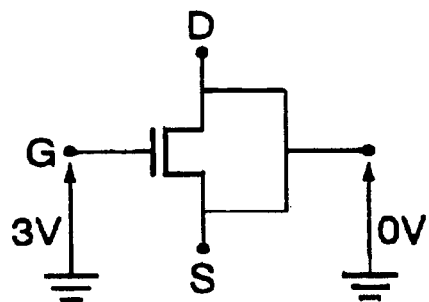
FIG. 1 is a schematic diagram showing operation of a MOS transistor in the "on" mode according to a preferred embodiment of the present invention.

FIG. 1 shows a MOS transistor for use in a switching device according to an embodiment of the present invention. The drain D and the source S are short-circuited. When an illustrative DC voltage of 3 volts is applied to the gate G and a zero voltage is applied to the source S, the voltage $V_{gs}$ is above the threshold voltage $V_t$ (which is in the order of 0.7–0.8 volts), so the MOS transistor is "on". Furthermore, because the voltage $V_{ds}$ between the drain D and source S is zero, the voltage $V_{gs}$ is greater than the sum of the voltage $V_{ds}$ and the voltage $V_t$, so the MOS transistor operates in the "ohmic" region and behaves as a voltage-controlled resistor.

If this MOS transistor in the on state is modeled by a series RC circuit, the resistance is equal to the sum of the gate resistance and one quarter of the channel resistance. This is because the channel that is formed between the drain D and the source S and lying under the oxide layer separating the channel from the gate G has, in the on state, a resistance distributed linearly between the drain D and the source S. So long as this resistance is distributed, it can be modeled by assuming that the contact with the oxide takes place only in the middle between the drain D and source S, and that this midpoint sees a resistance value of R/2 to the source.

Because of the short-circuiting of the drain D and source S, the value of the resistance is therefore one quarter of the value of the resistance of the channel. Thus, the resistance in the on state is of low value. The capacitance in the on state essentially consists of the capacitance of the oxide layer arranged between the gate G and the channel, and thus is of high value. The result is that the impedance between the gate G and the source S is low and decreases with frequency.

Figure 2:
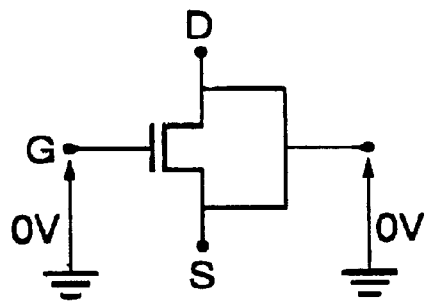
FIG. 2 is a schematic diagram showing operation of the MOS transistor in the "off" mode according to the preferred embodiment.

FIG. 2 shows the transistor of FIG. 1 with a zero voltage applied to both the gate G and the source S. The voltage $V_{gs}$ is zero and therefore below the threshold voltage $V_t$, so the MOS transistor is "off." Because the channel is not formed between the drain D and source S, the resistance in the off state is very high. The capacitance is formed only by the gate G on drain D and gate G on source S overlap capacitances, and is therefore of low value. The MOS transistor in the off state is therefore equivalent to an open switch.

Figure 3:
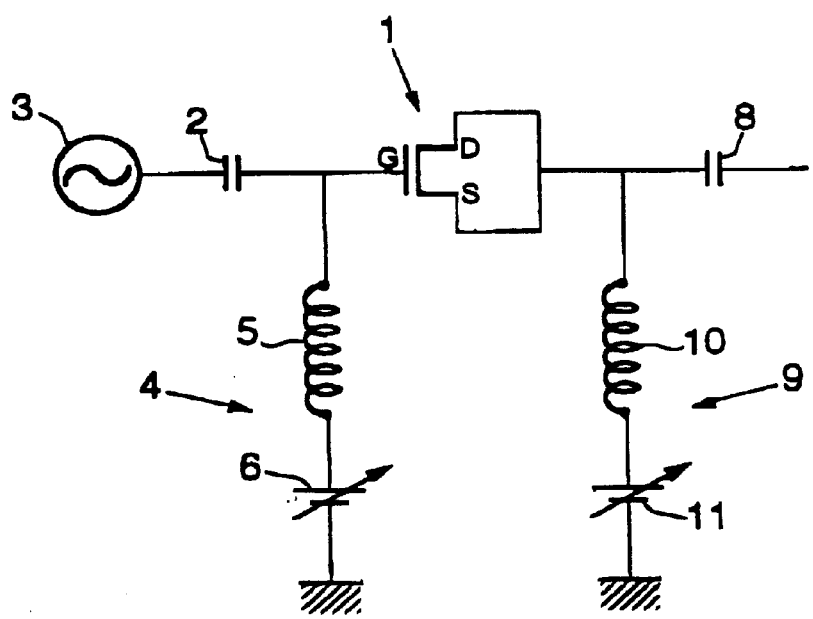
FIG. 3 is a schematic diagram of a switching device according to one embodiment of the present invention.

FIG. 3 illustrates one embodiment of a switching device according to the present invention. A MOS transistor 1 has its gate G connected to a capacitor 2, which is connected to a radio frequency signal source 3 (e.g., a portable telephone antenna). The gate G is also connected to a control circuit 4 containing an inductor 5 and a variable voltage source 6 arranged in series. The drain D and source S of the MOS transistor 1 are short-circuited and connected to another capacitor 8, which is connected to a load (not shown) that is to receive the radio frequency signal originating from the source 3. The drain D and source S are also connected to another control circuit 9 containing another inductor 10 and another variable voltage source 11 arranged in series.

The control circuits 4 and 9 operate in the following way. The generator 6 delivers either a zero voltage or a voltage of 3 volts. The generator 11 delivers either a zero voltage or a voltage such that the voltage $V_{gs}$ is above the threshold voltage of the MOS transistor. When the two generators 6 and 11 deliver a zero voltage, the voltage $V_{gs}$ is zero and the MOS transistor 1 is off. The MOS transistor 1 then has a high impedance to separate the radio frequency signals originating from the generator 3 from the load that is to receive such a signal. The capacitors 2 and 8 make it possible to isolate the other elements in the layout from the DC voltages delivered by the control circuits 4 and 9.

When the generator 6 delivers a DC voltage of 3 volts and the generator 11 delivers a zero voltage, the voltage $V_{gs}$ is equal to 3 volts and is therefore above the threshold voltage of the MOS transistor 1 to put it in the on state. The MOS transistor 1 then has a high capacitance and a low resistance so its impedance is low and decreases with the frequency of the signal passing through it. The radio frequency signal originating from the generator 3 (e.g., with a frequency of a few gigahertz) reaches the gate of the MOS transistor 1 via the capacitor 2, which is of low impedance in relation to such a signal.

The signal is not attenuated by the inductor 5 because it behaves as an open circuit to a high frequency signal. The signal then passes through the MOS transistor 1 and the capacitor 8, and is connected to the load. The inductor 10 at the output of the MOS transistor 1 also behaves as an open circuit to the radio frequency signal. Because of the difficulties of integrating inductors 5 and 10, these elements can advantageously be replaced by resistors of sufficient values as to not attenuate the radio frequency signal.

Figure 4:
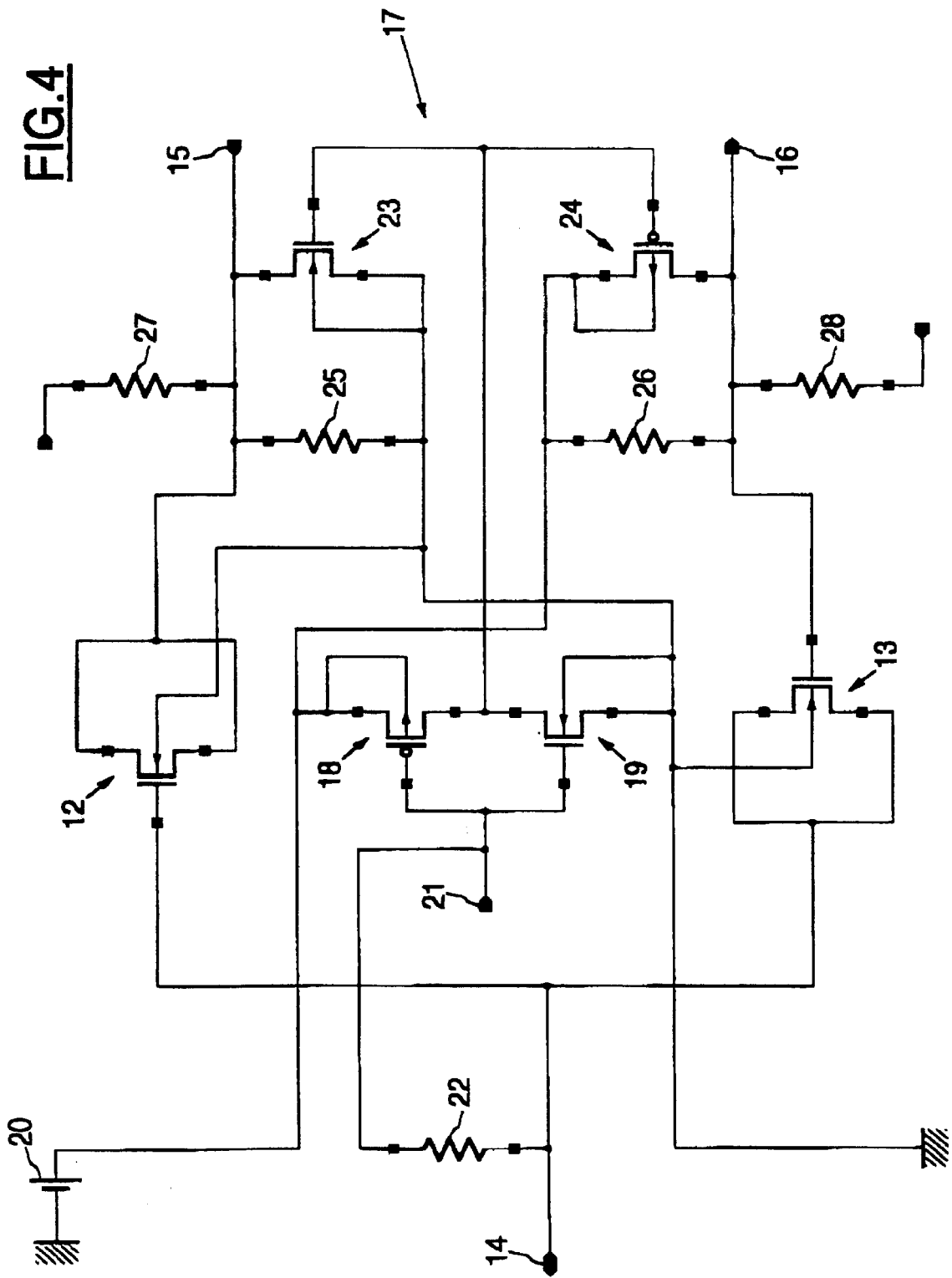
FIG. 4 is a schematic diagram of a switching device according to another embodiment of the present invention.

FIG. 4 shows another embodiment of a switching device according to the present invention. Two MOS transistors 12 and 13 are provided, making it possible to direct the radio frequency signal originating from an antenna 14 to either a transmission circuit 15 or a reception circuit 16. The gate of transistor 12 and the drain and the source of transistor 13 are connected to the antenna 14. The drain and source of transistor 12 are connected to the transmission circuit 15. The gate of transistor 13 is connected to the reception circuit 16.

Transistors 12 and 13 are controlled by a control circuit 17 having two MOS transistors 18 and 19 that are mounted in series to form an inverter. The entire device is supplied by a DC voltage source 20. The drain of transistor 18 is connected to the DC voltage source 20. The source of transistor 18 and the drain of transistor 19 are connected together. The source of transistor 19 is connected to ground. The gates of transistors 18 and 19 are connected together and receive a control signal from a terminal 21 that selects either the transmission mode or the reception mode. The gates of transistors 18 and 19 are also connected via a resistor 22 to the antenna 14.

The source of transistor 18 and the drain of transistor 19 are connected to the gates of two MOS transistors 23 and 24. The drain of MOS transistor 23 is connected to the drain and source of transistor 12. The source of transistor 23 is connected to ground. The drain of transistor 24 is connected to the DC voltage source 20. The source of transistor 24 is connected to the gate of transistor 13. A resistor 25 is arranged between the drain and source of transistor 12 and ground, and a resistor 26 is arranged between the gate of transistor 13 and the DC voltage source 20. Optionally, the drain and source of transistor 12 and the gate of transistor 13 can be connected to offset circuits (not shown) via resistors 27 and 28 in order to make it possible to adjust the biassing of the transistors 12 and 13.

This switching device operates in the following way. When a zero voltage is applied to terminal 21, the gates of transistors 18 and 19 are subjected to a zero voltage, the gate of transistor 12 is subjected to a zero voltage and the drain and source of transistor 13 are subjected to a zero voltage. The voltage $V_{gs}$ of transistor 19 is zero so it is off. Via resistor 22, the gate of transistor 12 and the drain and source of transistor 13 are also subjected to a zero voltage. The voltage $V_{gs}$ of transistor 12 is therefore zero so long as its source is connected to ground via resistor 25. Transistor 12 is therefore off. Via resistor 26, the gate of transistor 13 is subjected to the DC voltage from the source 20. The voltage $V_{gs}$, of transistor 13 is therefore above its threshold voltage so it is in the on state.

Because transistors 18 and 19 operate as an inverter, transistor 18 is on and its drain and source receive the same positive voltage originating from the source 20. The gates of transistors 23 and 24 therefore also receive this positive voltage. The voltage $V_{gs}$, of transistor 23 is above its threshold voltage so transistor 23 is on. The voltage $V_{gs}$ of transistor 24 is zero so it is off. The result is that the radio frequency signal arriving via the antenna 14 can be transmitted by transistor 13 to the reception circuit 16. Conversely, the signal is interrupted by transistor 12 between the antenna 14 and the transmission circuit 15. The values of the various resistors 22 and 25 through 28 are selected with values high enough (e.g., above 1 kΩ) so as not to significantly attenuate the radio frequency signal.

When a positive voltage is applied from terminal 21 (e.g., a voltage equal to the supply voltage provided by the source 20), the operation is reversed. Transistor 19 is on and transistor 18 is off. The gates of transistors 23 and 24 therefore see a zero voltage, from which it follows that transistor 23 is off and transistor 24 is on. Because transistor 23 is off and the gate of transistor 12 receives a positive voltage via resistor 22, the voltage $V_{gs}$ of transistor 12 is positive and above its threshold voltage. Transistor 12 is therefore on.

Conversely, transistor 24, whose gate is subjected to a zero voltage, is on. The gate of transistor 13 therefore receives a positive voltage, & its source and drain receive a positive voltage. The voltage $V_{gs}$ of transistor 13 is zero so it is off. The radio frequency signal originating from the transmission circuit 15 is therefore transmitted via the transistor 12 to the antenna 14, whereas any signal transmission between the antenna 14 and the reception circuit 16 is prevented by the fact that transistor 13 is off.

Figure 5:
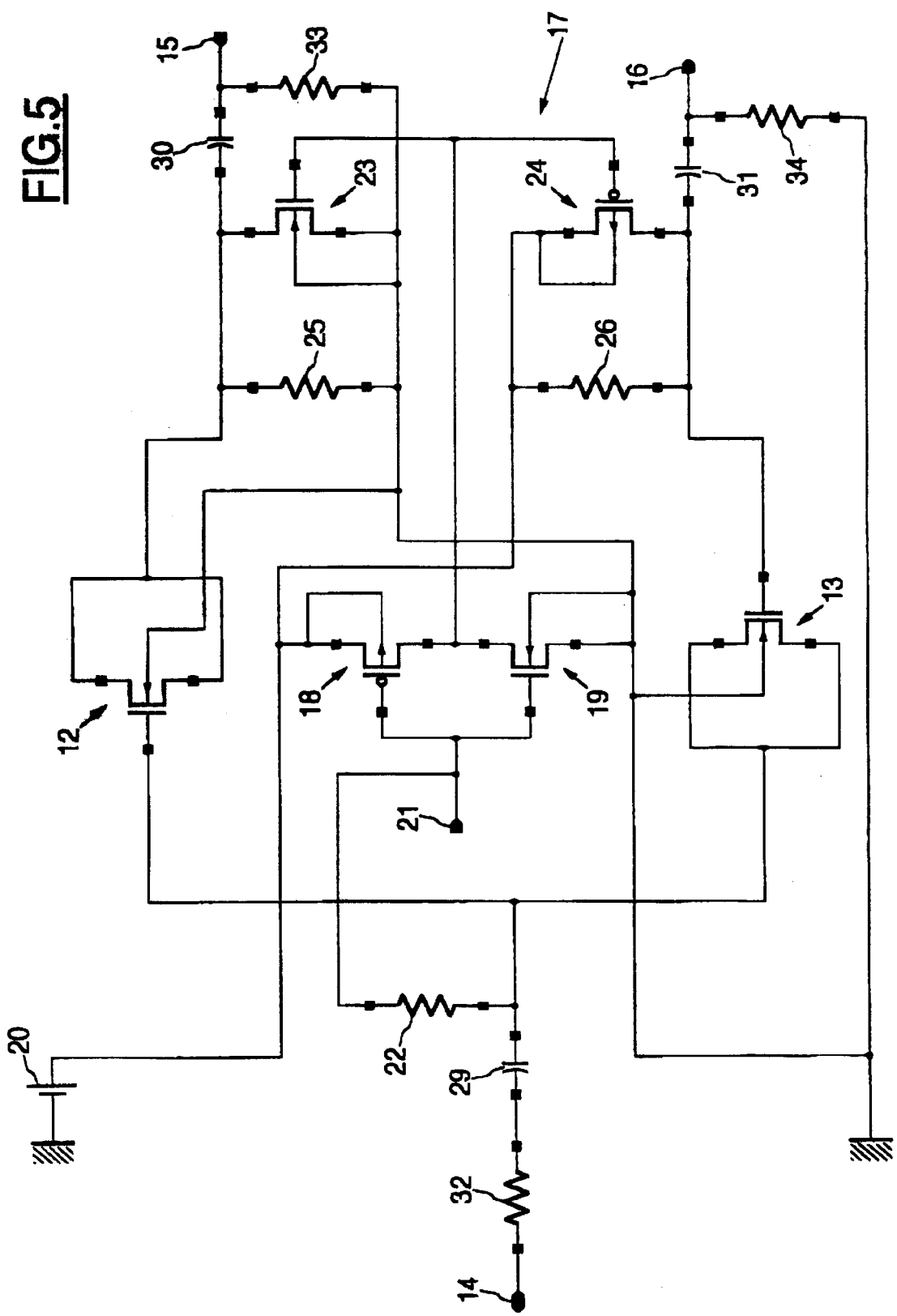
FIG. 5 shows a schematic diagram of a switching device according to yet another embodiment of the present invention.

FIG. 5 shows a variant of the switching device of FIG. 4. Here, coupling capacitors (similar in their principle to capacitors 2 and 8 in FIG. 3) are provided. One capacitor 29 is provided between the antenna 14 and the point common to resistor 22, the gate of transistor 12, and the drain and source of transistor 13. Another capacitor 30 is provided between the transmission circuit 15 and the point common to the drain and source of transistor 12, the drain of transistor 23, and resistor 25. Another capacitor 31 is provided between the reception circuit 16 and the point common to the gate of transistor 13, the source of transistor 24, and resistor 26.

Furthermore, resistors (e.g., of 50 ohms) are provided so that the circuits (not shown) connected to the switching device see such a (50 ohm) resistance. One resistor 32 is arranged between capacitor 29 and the antenna 14, another resistor 33 is arranged between the common point of capacitor 30 and the transmission circuit 15 and ground and another resistor 34 is arranged between the point common to capacitor 31 and the reception circuit 16 and ground.

Figure 6:
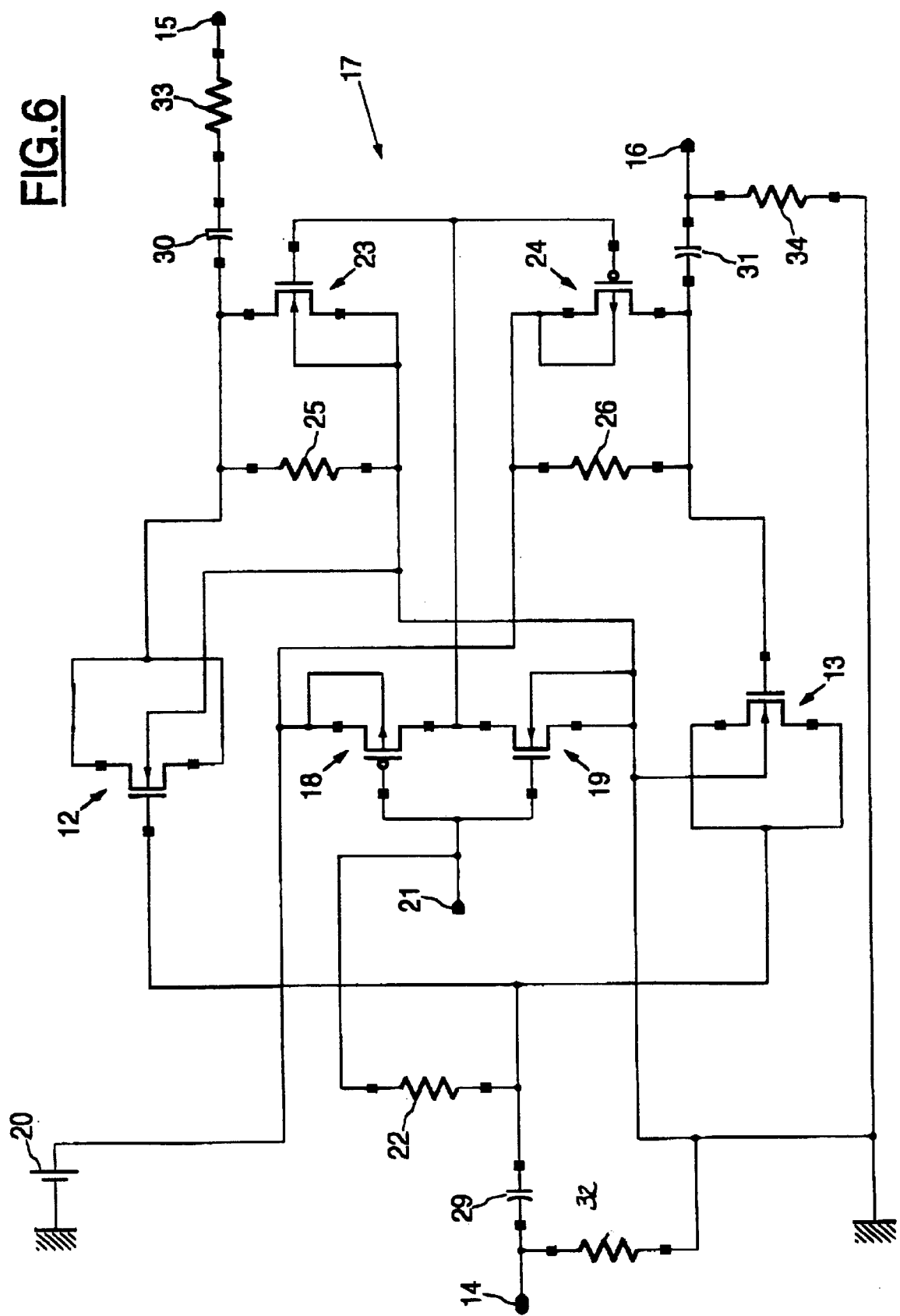
FIG. 6 shows a schematic diagram of a switching device according to still another embodiment of the present invention.

FIG. 6 shows a variant of the switching device of FIG. 5 that differs insofar as resistor 32 is arranged between the point common to capacitor 29 and the antenna 14 and ground, and resistor 33 is arranged in series between capacitor 30 and the transmission circuit 15.

By virtue of such layouts of the MOS transistors, it is possible to use MOS transistors as controllable capacitors. Thus, it is possible to increase the switching speed in comparison with conventional circuits. In the on mode, only one quarter of the channel resistance is seen, so it is possible to either profit from a low value resistance or to reduce the area of silicon used.

While in the illustrated embodiments transistors 23 and 24 are presented in a conventional configuration, in further embodiments they could be connected as controlled capacitors in a similar fashion to transistors 12 and 13. Furthermore, because either their drain or source is grounded, one of the two equivalent diodes formed between the drain and the substrate and between the source and the substrate is not involved, so there is a reduction in stray capacitances. Further, it is particularly beneficial to use a MOS transistor as a controlled capacitor insofar as it has a capacitance per unit area on the order of five times greater than that of an integrated capacitor.

Accordingly, the present invention provides a switching circuit for radio frequency signals that has a high switching speed, is inexpensive in terms of integrated circuit area, has performance that improves as the frequency of the switched signal increases, and can be adapted to improvements in MOS transistor technology.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A device for switching radio frequency signals, said device comprising:
    at least a first MOS transistor for selectively interrupting or transmitting the radio frequency signals between at least first and second terminals as a function of a control signal,
    wherein the gate of the first MOS transistor is connected to the first terminal, and
    both the drain and source of the first MOS transistor are connected to the second terminal so as to short-circuit the drain and source of the first MOS transistor.

2. The device as defined in claim 1, further comprising a second MOS transistor coupled between the second terminal and ground.

3. The device as defined in claim 2, further comprising a control circuit for controlling the first MOS transistor, the control circuit being connected to the gate and the source of the first MOS transistor.

4. The device as defined in claim 1, further comprising a control circuit for controlling the first MOS transistor, the control circuit being connected to the gate and the source of the first MOS transistor.

5. The device as defined in claim 4, wherein the control circuit is decoupled from the radio frequency signals.

6. The device as defined in claim 5, wherein the control circuit includes at least one inductor.

7. The device as defined in claim 5, wherein the control circuit includes at least one resistor of sufficient value as to not attenuate the radio frequency signals.

8. The device as defined in claim 4, wherein the control circuit includes:
    a first resistor coupled between the source of the first MOS transistor and ground; and
    a controllable voltage source and a second resistor arranged in series and coupled between the gate of the first MOS transistor and ground.

9. The device as defined in claim 8, wherein the controllable voltage source includes an inverter having MOS transistors coupled between ground and a DC voltage source.

10. The device as defined in claim 9, further comprising a control terminal that is connected to the input of the inverter, the control terminal also being coupled to the gate of the first MOS transistor via a resistor.

11. The device as defined in claim 1, wherein the device is coupled between an antenna and at least one of a transmission circuit and a reception circuit.

12. The device as defined in claim 1, further comprising:
   a second MOS transistor for selectively interrupting or transmitting the radio frequency signals between the first terminal and a third terminal as a function of the control signal,
   wherein the gate of the second MOS transistor is connected to the third terminal,
   both the drain and source of the second MOS transistor are connected to the first terminal, and
   the first MOS transistor selectively interrupts or transmits the radio frequency signals between the first terminal and the second terminal as a function of the control signal.

13. The device as defined in claim 12, further comprising a third MOS transistor coupled between the second terminal and ground.

14. The device as defined in claim 12, further comprising a control circuit for controlling the first and second MOS transistors, the control circuit being connected to the gate and the source of the first and second MOS transistors.

15. The device as defined in claim 14, wherein the control circuit is decoupled from the radio frequency signals.

16. The device as defined in claim 14, wherein the control circuit includes:
   a first resistor coupled between the source of the first MOS transistor and ground; and
   a controllable voltage source and a second resistor arranged in series and coupled between the gate of the first MOS transistor and ground.

17. The device as defined in claim 14, further comprising a control terminal that is coupled to the first and second MOS transistors via at least one resistor.

18. The device as defined in claim 12,
   wherein the first MOS transistor is coupled between an antenna and a transmission circuit, and
   the second MOS transistor is coupled between the antenna and a reception circuit.

19. The system as defined in claim 1, wherein said device further comprises a second MOS transistor coupled between the second terminal and ground.

20. The system as defined in claim 19, wherein said device further comprises a control circuit for controlling the first MOS transistor, the control circuit being connected to the gate and the source of the first MOS transistor.

21. The system as defined in claim 19, wherein said device further comprises:
   a second MOS transistor for selectively interrupting or transmitting the radio frequency signals between the first terminal and a third terminal of the system as a function of the control signal,
   wherein the gate of the second MOS transistor is connected to the third terminal,
   both the drain and source of the second MOS transistor are connected to the first terminal, and
   the first MOS transistor selectively interrupts or transmits the radio frequency signals between the first terminal and the second terminal as a function of the control signal.

22. The system as defined in claim 12 further comprising:
   an antenna;
   a transmission circuit; and
   a reception circuit,
   wherein the fir MOS transistor is coupled between the antenna and the transmission circuit, and
   the second MOS transistor is coupled between the antenna and the reception circuit.

23. A radio frequency system including at least one device for switching radio frequency signals, said device comprising:
   at least a first MOS transistor for selectively interrupting or transmitting the radio frequency signals between at least first and second terminals as a function of a control signal,
   wherein the gate of the first MOS transistor is connected to the first terminal, and
   both the drain and source of the first MOS transistor are connected to the second terminal so as to short-circuit the drain and source of the first MOS transistor.

* * * * *